United States Patent [19]

Sakakibara et al.

[11] 3,984,647

[45] Oct. 5, 1976

[54] SWITCHING MECHANISM ASSOCIATED WITH GOVERNOR MECHANISM

[75] Inventors: Naoji Sakakibara, Chiryu; Masahiko Shibata, Toyota, both of Japan

[73] Assignee: Aisin Seiki Kabushiki Kaisha, Japan

[22] Filed: July 17, 1975

[21] Appl. No.: 596,671

Related U.S. Application Data

[63] Continuation of Ser. No. 486,227, July 5, 1974, abandoned.

[30] Foreign Application Priority Data

July 12, 1973 Japan ............................... 48-78958

[52] U.S. Cl. ................................ 200/80 R; 73/535

[51] Int. Cl.[2] ........................ H01H 35/10; G01P 3/16

[58] Field of Search .................... 200/80 R; 102/79; 73/535, 536, 546; 317/5

[56] References Cited

UNITED STATES PATENTS 3,209,093 9/1965 Simpson ........................... 200/80 R

*Primary Examiner*—Herman J. Hohauser

*Attorney, Agent, or Firm*—Oblon, Fisher, Spivak, McClelland & Maier

[57] ABSTRACT

In a governor switch apparatus including a governor mechanism to be driven at various speeds of a rotary element and a switching mechanism to be actuated by the governor mechanism, the switching mechanism comprises a seesaw lever to be actuated at its central portion by the governor mechanism, a first switching device engageable with a first end of the lever and provided with a first normally open switch, a second switching device engageable with a second end of the lever to be assembled symmetrically with the first switching device and provided with a second normally open switch, and a stopper for blocking the movement of the first end of the lever after closure of the first switch. The first switch is closed prior to the second switch due to a difference between the resilient forces given to the first and second switching devices respectively.

13 Claims, 3 Drawing Figures

SWITCHING MECHANISM ASSOCIATED WITH GOVERNOR MECHANISM

This is a continuation of application Ser. No. 486,227 filed July 5, 1974 now abandoned.

BACKGROUND OF THE INVENTION

The present invention relates to a governor switch apparatus for control devices to be operated in accordance with the speed of a rotary element such as an output shaft of a vehicle engine and the like, and more particularly to an improvement of a switching mechanism associated with a governor mechanism driven by the rotary element.

SUMMARY OF THE INVENTION

The prime object of the present invention is to provide an improved switching mechanism in which a first and a second switches are independently actuated in response to low and high speeds of a rotary element respectively and the whole switching mechanism is compactly associated with a governor mechanism driven by the rotary element.

Another object of the present invention is to provide an improved switching mechanism, having the above-mentioned characteristics, wherein the first switch is actuated prior to the second switch due to a difference between the resilient forces given to the first and second switches respectively.

A further object of the present invention is to provide an improved switching mechanism, having the above-mentioned characteristics, wherein simple and external adjustment is enabled independently for the opening and/or closure timing of the first and second switches in accordance with the nature of devices to be controlled.

Still further object of the present invention is to provide an improved switching mechanism, having the above-mentioned characteristics, wherein the opening condition of the first and second switches can stably be held by a stopper means for arresting the movement of the switches during the inoperative condition of the governor mechanism and the closed condition of the first switch can be maintained by another stopper means for blocking the movement of the first switch after the closure of the first switch.

BRIEF DESCRIPTION OF THE DRAWINGS

Additional objects and advantages of the present invention will be more readily apparent from the following detailed description of an embodiment thereof when taken together with the accompanying drawings in which.

DESCRIPTION OF AN ILLUSTRATED EMBODIMENT

Figure 1:
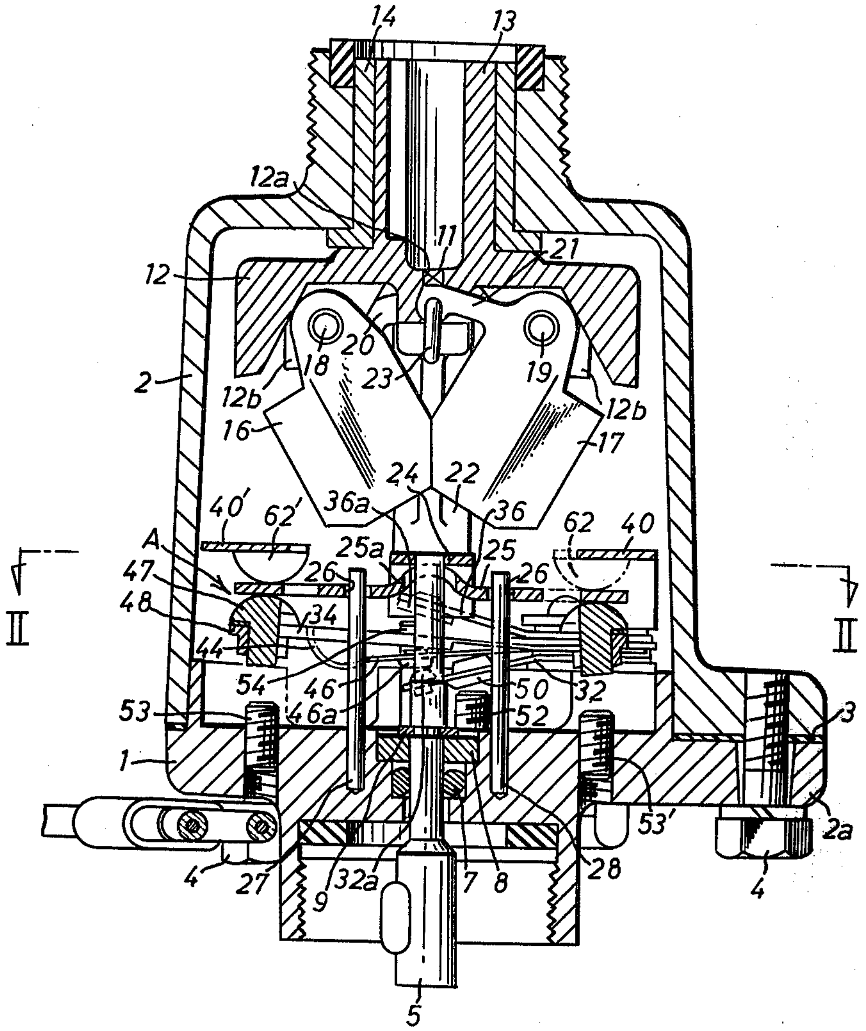
FIG. 1 is a view of an elevational cross-section of a governor switch apparatus in accordance with the present invention, showing a cross-section taken along line I—I of FIG. 2.

Referring now to the drawings, a governor switch apparatus in accordance with the present invention comprises an improved switching mechanism assembled on a switch base 1 which is mounted on a portion of a vehicle transmission (not shown) and a governor mechanism assembled within a housing 2 coupled with the switch base 1 by bolts 4 threaded in the flanges 2*a* of the housing 2 through an annular gasket 3, as shown in FIG. 1.

The governor mechanism includes a carrier 12 journalled on the housing 2, a governor shaft 5 supported by the carrier 12 and the switch base 1, a pair of governor weights 16 and 17 pivoted on the carrier 12, and a sliding member 22 axially movable on the shaft 5. The carrier 12 is provided with a square hole 12*a* to support the top end 11 of the shaft 5 and is rotatably mounted on the head portion of the housing 2 through a metal bearing 14 so that a torque receiving portion 13 of the carrier 12 is connected with one end of a speedometer cable (not shown). The top end 11 of the governor shaft 5 is formed to have a square cross-section which is correspondingly engaged with the square hole 12*a* of the carrier 12 and the base portion of the shaft 5 is journalled on the switch base 1 by way of an O-ring 7, a spacer 8 and a thrust washer 9 which is an E-shape ring mounted on the shaft 5, the base end of the shaft 5 being driven by the vehicle transmission.

The governor weights 16 and 17 are pivoted respectively on the arms 12*b* of the carrier 12 by way of pins 18 and 19 so that under the centrifugal action of the revolving of the shaft 5 these weights 16 and 17 move outwardly and inwardly around the pivot pins 18 and 19. The weights 16 and 17 further include legs 20 and 21 respectively connected with the end portion of the sliding member 22 by clips 23.

Adjacent the carrier 12, the sliding member 22 is made of synthetic resin and is slidably coupled on the shaft 5 to move a seesaw lever 25 through a U-shape thrust plate 24 along the axis of the shaft 5 by way of the engagement with the legs 20 and 21 when the weights 16 and 17 move outwardly and inwardly. The seesaw lever 25 has the shaft 5 passing there-through at the center 25*a* thereof and is prevented from its rotation by a pair of stopper pins 27 and 28 the top ends of which are inserted through holes 26 provided on the lever 25 and the base ends of which are fixed on the switch base 1. Moreover, the seesaw lever 25 is prevented at its both ends from its upward movement toward the weights 16 and 17 by means of a pair of stopper plates 40 and 40' including bosses 62 and 62' for engagement with the seesaw lever 25 respectively. The thrust plate 24 has its legs engaged with the both sides of the seesaw lever 25 for integrated movements with the lever 25 and the stopper plates 40 and 40' are fixedly mounted on the switch base 1.

Figure 2:
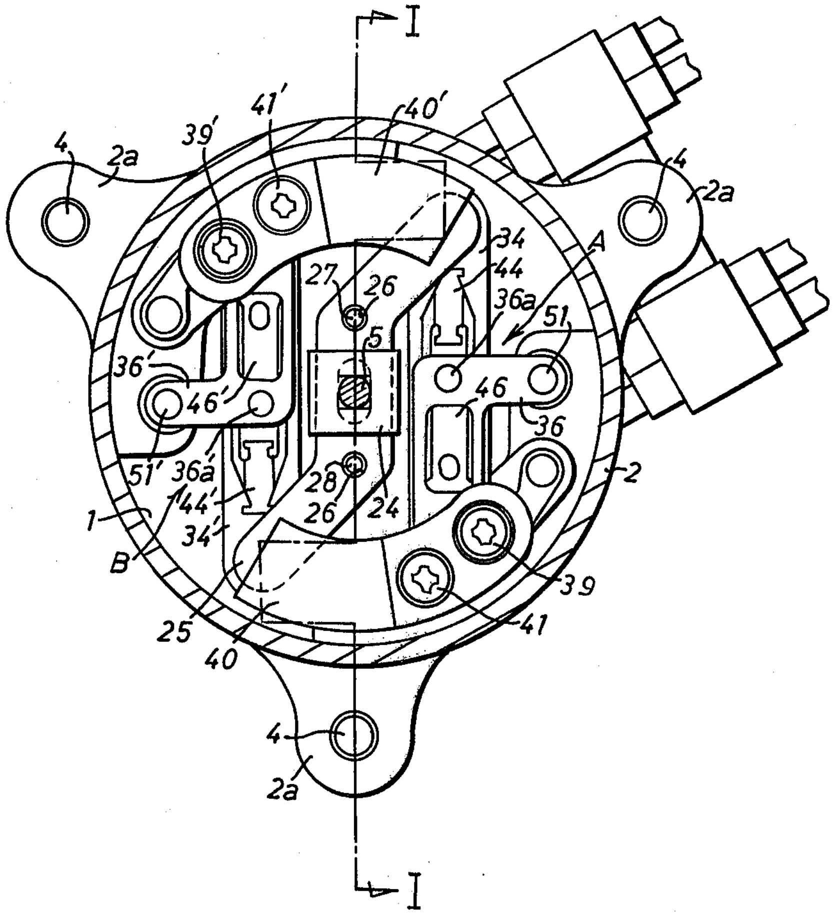
FIG. 2 is a view of transversal cross-section taken along line II—II of FIG. 1.
Figure 3:
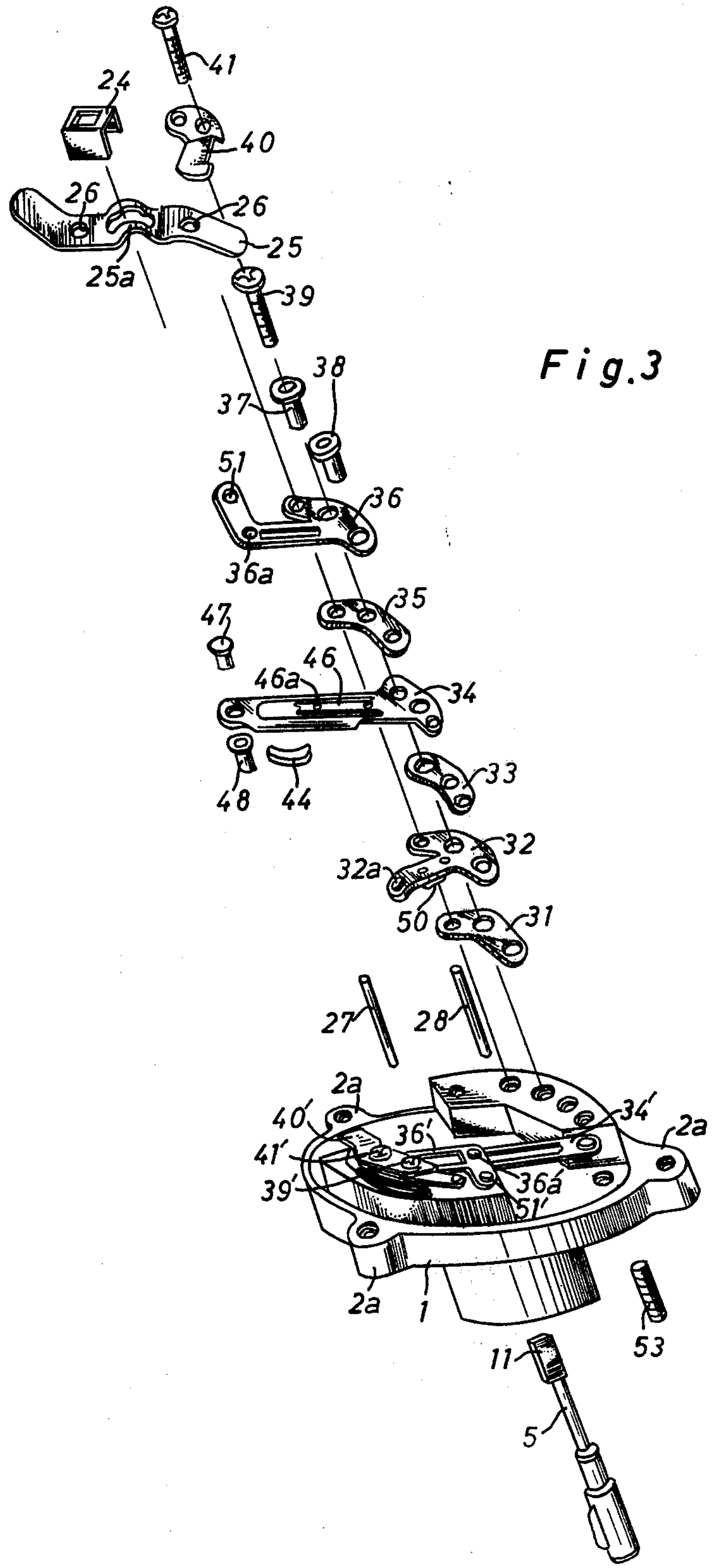
FIg. 3 is a perspective view to reveal the switching mechanism with the housing and the governor mechanism removed.

As best ovserved in FIGS. 2 and 3, the improved switching mechanism comprises a first and a second switching mechanisms A and B which are associated with the above-mentioned governor mechanism by way of the thrust plate 24 and the seesaw lever 25 and arranged symmetrically around the seesaw lever 25.

In the first switching mechanism A, a first contact holder 32, a switch plate 34 and a second contact holder 36 are fixedly mounted on the switch base 1 at the base ends thereof together with the stopper plate 40 by fastening screws 39 and 41 through insulators 31, 33, 35, 37 and 38. The first contact holder 32 is provided at its free end portion with a fixed contact 32*a* caulked thereon. Under the holder 32 in FIG. 1, a first adjusting screw 52 is threadedly mounted on the switch base 1 from the outside for engagement with a screw driver to adjust the position of the fixed contact 32*a* upwardly or downwardly through an insulator 50 adhered on the contact holder 32. The second contact holder 36 is provided at its corner portion with a fixed contact 36*a* caulked thereon. Under the free end of the holder 36 in FIGS. 1 and 2, a second adjusting screw 54 is threadedly mounted on the switch base 1 from the outside to adjust the position of the fixed contact 36*a* upwardly or downwardly through an insulator 51 adhered on the contact holder 36.

The switch plate 34 is composed on a leaf spring member the free end of which is engaged with a first end of the seesaw lever 25 by way of an insulating plug 47 which is coupled in an insulating sleeve 48 through the free end of the switch plate 34. Thus, the switch plate 34 urges the first end of the seesaw lever 25 toward the boss 62' of the stopper plate 40' by its resilient force. At the flap portion 46 integrally extended from the spring member 34, caulked is a movable contact 46*a* to be engaged with the first and second fixed contacts 32*a* and 36*a*. A bowed spring 44 is inserted under compression between the flap portion 46 and an opening end of the spring member 34 to afford the switch plate 34 snap or over-centering action thereof. Under the free end of the switch plate 34, a stopper pin 53 is threadedly mounted on the switch base 1. (See FIG. 1) The stopper pin 53 blocks the downward movement of the free end of the switch plate 34 so as to secure the closed condition of the first switching mechanism A.

In the second switching mechanism B, a switch plate 34' and contact holders 32' and 36' are assembled on the switch base 1 at their base ends together with the stopper plate 40' by fastening screws 39' and 41' in the same way as the first switching mechanism A so that they are symmetrically arranged with the switch plate 34 and the contact holders 32 and 36. Adjusting screws corresponding with the first and second screws 52 and 54 are also provided under the contact holders 32' and 36'. Under the free end of the switch plate 34', stopper pin 53' is threadedly mounted on the switch base 1 to block the downward movement of the free end of the switch plate 34'.

Thus, the above-mentioned switching mechanisms A and B are characterized in that the resilient force of the switch plate 34' of the second switching mechanism B is larger than that of the switch plate 34 of the first switching mechanism A and the seesaw lever 25 is stably engaged at its both ends with the bosses 62 and 62' of the stopper plates 40 and 40' by means of the resilient forces of the switch plates 34 and 34'. In other words, the upward movement of the switch plates 34 and 34' are blocked by the bosses 62 and 62' of the stopper plates 40 and 40' by way of the first and second ends of the seesaw lever 25 respectively. Thus, the opening conditions of the switching mechanisms A and B are stably secured regardless of any external vibration during the inoperative condition of the governor mechanism.

In operation, as the governor shaft 5 is rotated and the governor speed increases, the weights 16 and 17 move outwardly by centrifugal force given thereon. This causes thrusting engagement of the legs 20 and 21 of the weights 16 and 17 with the sliding member 22 which urges, in turn, the seesaw lever 25 toward the switch plates 34 and 34' through the thrust plate 24.

As the resilient force of the switch plate 34' is larger than that of the switch plate 34, the switch plate 34 is first given lever action with a fulcrum of its base end fixedly mounted on the switch base 1. When the free end of the switch plate 34 is displaced to a position to effect the spring 44, snap action of the flap portion 46 of the switch plate 34 is effected to engage its movable contact 46*a* with the fixed contact 36*a*. Thus, the first switching mechanism A is actuated and the following movement of the first switch plate 34 is blocked by the stopper pin 53.

Further increase of the governor speed displaces the seesaw lever 25 to cause lever action of the second switch plate 34' with a fulcrum at its base end. Effecting the spring 44', the second switch plate 34' makes its snap action to engage the movable contact 46*a* with the fixed contact 36*a*. Now, the second switching mechanism B is actuated.

When the thrusting force onto the seesaw lever 25 is decreased in accordance with the decrease of the governor speed, over-centering action of the second switch plate 34' is effected and, in turn, the switch plate 34' is returned to its original position to open the second switching mechanism B.

Further decrease of the governor speed permits the first switch plate 34 to return toward its original position. When over-centering action of the first switch plate 34 is effected, the movable contact 46*a* of the switch plate 34 engages with the fixed contact 32*a* of the holder 32 to open the first switching mechanism A.

In the above-mentioned operation, it should now be clear that the adjusting screws 54 and 54' (not shown) control respectively and independently the closure timing of the first and second switching mechanisms A and B, forwarding of these screws advancing the closure timing. The adjusting screws 52 and 52' (not shown) regulate respectively and independently the opening timing of the first and second switching mechanisms A and B. The difference of the resilient forces between the first and second switch plates 34 and 34' is designed to enable that the first switching mechanism A is always closed prior to the closure of the second switching mechanism B. Thus, the selection of the value for the resilient force difference controls the closure timing of the second switching mechanism B in respect with the closure timing of the first switching mechanism A.

Furthermore, it should well be understood that the free ends of the switch plates 34 and 34' may engage directly the bosses 62' and 62 of the stopper plates 40' and 40.

Although a certain specific embodiment of the present invention has been shown and described, it is obvious that many modifications and variations thereof are possible in light of these teachings. It is to be understood therefore that within the scope of the appended claims, the invention may be practiced otherwise than as specifically described herein.

What is claimed is:

1. In a governor switch apparatus comprising a housing mounted on a switch base, a governor mechanism assembled within said housing to be driven at various speeds of a rotary element, and a switching mechanism assembled on said switch base to be actuated by said governor mechanism, the improvement wherein said switching mechanism comprises:

a seesaw lever to be actuated at its central portion by said governor mechanism in response to the speed to said rotary element;

a first switchimg means including a first self-biased overcenter snap acting plate tiltably mounted at its base end on said switch base to be engaged with a first end of said seesaw lever at its free end and provided thereon with a first movable contact, a first support member mounted at its base end on said switch base together with said first plate and provided thereon with a first fixed contact being normally engageable with said first movable contact to form a first switch being normally in one of a closed position and an open position;

a second switching means to be arranged symmetrically with said first switching means around said seesaw lever and including a second self-biased overcenter snap acting plate tiltably mounted at its base end on said switch base to be engaged with a second end of said seesaw lever at its free end and provided thereon with a second movable contact, a second support member mounted at its base end on said switch base together with said second plate and provided thereon with a second fixed contact being normally engageable with said second movable contact to form a second switch being normally in one of a closed position and an open position, the resilient force of said second plate being larger than that of said first plate to position said second switch in its other position after repositioning of said first switch to its other position; and means for blocking the movement of the first end of said seesaw lever after said repositioning of said first switch by means of actuation of said lever.

2. A governor switch apparatus as claimed in claim 1, wherein said switching means further comprises means for arresting the free ends of said first and second self-biased overcenter snap acting plates during the inoperative condition of said governor mechanism.

3. A governor switch apparatus as claimed in claim 2, wherein said arresting means comprises a first stopper mounted at its base end on said switch base together with said first plate and said first support member to receive thereon the free end of said second plate through the second end of said seesaw lever; and a second stopper mounted at its base end on said switch base together with said second plate and said second support member to receive thereon the free end of said first plate through the first end of said seesaw lever.

4. A governor switch apparatus as claimed in claim 1, wherein the normal one positions of said first and second switches are the open positions thereof.

5. A governor switch apparatus as claimed in claim 1, wherein the normal one positions of said first and second switches are the closed positions thereof.

6. A governor switch apparatus as claimed in claim 5, wherein said first switching means further includes a third support member mounted at its base end on said switch base together with said first plate and said first support member and provided thereon with a third fixed contact engageable with said first movable contact to form a first normally open switch.

7. A governor switch apparatus as claimed in claim 5, wherein said second switching means further includes a fourth support member mounted at its base end on said switch base together with said second plate and said second support member and provided thereon with a fourth fixed contact to form a second normally open switch associated with the second movable contact of said second plate.

8. A governor switch apparatus as claimed in claim 4 wherein said first switching means further includes a third support member mounted at its base end on said switch base together with said first plate and said first support member and provided thereon with a third fixed contact to be normally engaged with said first movable contact to form a first normally closed switch.

9. A governor switch apparatus as claimed in claim 4 wherein said second switching means further includes a fourth support member mounted at its base end on said switch base together with said second plate and said second support member and provided thereon with a fourth fixed contact to form a second normally closed switch associated with the second movable contact of said second plate.

10. A governor switch apparatus as claimed in claim 1, wherein said switching mechanism further comprises a first and a second adjusting means for independently adjusting each of the normal other positions of said first and second switches respectively.

11. A governor switch apparatus as claimed in claim 1, wherein said switching mechanism further comprises a third and a fourth adjusting means for independently adjusting each of the normal one positions of said first and second switches respectively.

12. A governor switch apparatus as claimed in claim 4, wherein said blocking means is a stopper pin threadedly mounted on said switch base externally to receive thereon the free end of said first self-biased overcenter snap acting plate, whereby the movement of the first end of said seesaw lever is blocked after closure of said first normally open switch.

13. A governor switch apparatus as claimed in claim 4, wherein said second switching means further includes a stopper pin threadedly mounted on said switch base externally to receive thereon the free end of said second self-biased overcenter snap acting plate, whereby the movement of the second end of said seesaw lever is blocked after closure of said second normally open switch.

* * * * *